United States Patent [19]
Kikuchi et al.

[11] Patent Number: 5,717,141
[45] Date of Patent: Feb. 10, 1998

[54] METHOD AND APPARATUS FOR EVALUATING VIBRATIONS OF A ROTARY BODY WHILE MAINTAINING THE ROTARY BODY IN A STATIC OR NON-ROTATIONAL STATE

[75] Inventors: Kiyotaka Kikuchi, Naka-gun; Kiyoshi Gunji, Higashi-ibaraki-gun, both of Japan

[73] Assignee: Doryokuro Kakunenryo Kaihatsu Jigyodan, Tokyo-to, Japan

[21] Appl. No.: 625,070

[22] Filed: Mar. 29, 1996

[30] Foreign Application Priority Data

Apr. 27, 1995 [JP] Japan ................................. 7-127208

[51] Int. Cl.⁶ ................................................. G01M 7/02
[52] U.S. Cl. ................................................. 73/579; 73/660
[58] Field of Search .......................... 73/579, 660, 659, 73/668

[56] References Cited

U.S. PATENT DOCUMENTS

| | | | |
|---|---|---|---|
| 3,130,576 | 4/1964 | Giers et al. | 73/660 |
| 4,078,434 | 3/1978 | Weberhofer | 73/579 |
| 4,805,457 | 2/1989 | Oates et al. | 73/660 |
| 5,097,355 | 3/1992 | Eden . | |
| 5,520,061 | 5/1996 | Thibault et al. | 73/660 |

FOREIGN PATENT DOCUMENTS 0193609 9/1986 European Pat. Off. .

OTHER PUBLICATIONS

Patent Abstracts of Japan, vol. 007, No. 156 (P-209) (Abstract of JP 58 066826) (1958).
Database WPI, Section El, Week 8409 (Abstract of SU 1 016 720 A) (1983).

*Primary Examiner*—John E. Chapman
*Attorney, Agent, or Firm*—Wenderoth, Lind & Ponack

[57] ABSTRACT

A method and apparatus for evaluating the vibration of a rotary body in a static or non-rotational state to determine a profile of critical speeds including profiles of critical speeds which exist beyond a rated revolution velocity of the rotary body. This invention comprises: a plurality of bearings for maintaining the rotary body in a non-rotating or static condition; a rotary vibrator for applying an exciting force which is rotated about a shaft to the rotary body; a vibration sensor for detecting the vibration of the rotary body; a vibration meter for measuring an output from the vibration sensor; and a vibration power source for supplying AC power to the rotary vibrator and for sweeping a frequency of the exciting force applied from the rotary vibrator to the rotary body from a low-frequency region to a high-frequency region. Thus, the present invention obtains the vibrational characteristics of the rotary body in a simulated rotational or dynamic state in which the rotating body is actually maintained in a static or non-rotational state.

6 Claims, 4 Drawing Sheets

METHOD AND APPARATUS FOR EVALUATING VIBRATIONS OF A ROTARY BODY WHILE MAINTAINING THE ROTARY BODY IN A STATIC OR NON-ROTATIONAL STATE

BACKGROUND OF THE INVENTION

This invention relates to a method and apparatus for evaluating the vibration of a rotary body in a static or non-rotational state, and more particularly relates to a vibration evaluation method and apparatus adapted to obtain a vibrational response which is very similar to that which appears in a rotational or dynamic state from which a gyroscopic effect due to the rotation of a rotary body is eliminated, by applying an exciting force which is rotated about a shaft to the rotary body with the rotary body maintained in a static or non-rotational state.

A rotary machine has a critical speed at which an amplitude of vibration increases suddenly when the revolution velocity of the rotary body increases to coincide with a natural frequency. When a rotary body having a plurality of critical speeds is rotated to reach a rated revolutionary velocity, the rotational speed of the rotary body passes critical speeds which constitute vibration resonance points. If a vibration damper cannot be set at an optimum level for a particular critical speed, the unbalance occurring during the manufacture of the rotary machine appears as a violent vibrational response at the particular critical speed, and the rotary machine will enter an unstable vibrational condition. Consequently, the breakage of bearing occurs, and further rotation of the rotary body becomes impossible. Therefore, the vibration damper is set at an optimum level to minimize vibration during the designing and testing of the rotary machine. Accordingly, in order to design and manufacture a rotary machine, it is first necessary to obtain a vibrational response of a rotary body first.

When the length and revolution velocity of a rotary body in a rotary machine increase, the vibration resonance points at critical speeds of the rotary body exhibit a complicated mode of occurrence. Consequently, a vibration design analysis of the rotary body is performed, and a critical speed at which the rotary body forms a vibration-stable system is set. A satisfactory rotary body just as described, however, is not necessarily obtained due to a difference in physical properties of the rotary body. When a critical speed error is large, the vibration of the rotary body becomes unstable, and the rotary body becomes unable to be rotated. Therefore, it is necessary to subject a rotary body to a vibration test in a static or non-rotational state, obtain a mode of occurrence of vibration at a critical speed and secure the rotational performance prior to actual rotation of the rotary body.

The conventional techniques for evaluating the vibration of a rotary body by vibrating the rotary body in a static or non-rotational state include the following:

(1) A method of striking a rotary body with an impulse hammer.

(2) A method of vibrating a rotary body by using sound waves via an electrodynamic loudspeaker.

(3) A method of vibrating a rotary body directly by using an electrodynamic system.

(4) A method of vibrating a rotary body directly by using an electrohydraulic system.

(5) A method of vibrating a rotary body by attracting an iron shaft of the rotary body to an electromagnet.

All of these methods are basically one-dimensional vibrating methods which are divided into methods of vibrating a rotary body in a suspended state, and methods of vibrating a rotary body inclusive of a static or non-rotational body.

Among these conventional techniques for vibrating a rotary body in a static or non-rotational state, method (1) of striking a rotary body with an impulse hammer is simple but an exciting force obtained is small such that conducting a highly accurate measurement is difficult; method (2) of vibrating a rotary body by using a loudspeaker has an advantage in that the vibrating of the rotary body can be performed in a non-contacting manner but an exciting force obtained is small. Furthermore, since an air-borne exciting force is utilized, an exciting force transmission delay occurs; method (3) of the electrodynamic type direct vibrating brings about a result which is different from an originally expected result since the vibrating object is fixed directly to a rotary body; method (4) of the electrohydraulic system has a problem in that vibrating a rotary body with a high frequency is difficult to perform; and method (5) of the electromagnetic attraction system cannot be applied to a non-magnetic rotary body, and furthermore, it provides only a small exciting force to a magnetic rotary body. The results of the one-dimensional vibrating operations in all of these conventional methods show that vibration attributed to the rotary body itself, which does not occur in a rotating or dynamic state, occurs in addition to critical speed resonance vibration, that inconsistent data is obtained due to the variation of the suspended state of the rotary body, and that the accuracy of the data is unreliable since the resonance of solely a static or non-rotational body occurs as well when such a static body is included in a rotary machine. When the accuracy of the data is unreliable, a critical speed cannot be set accurately, and this has great influence upon the operation efficiency of a subsequent practical rotation test.

According to the conventional techniques, a rough test is conducted by the above-mentioned methods. However, when a rotary body is designed and manufactured, it is necessary to install the rotary body in an operable or functioning rotary machine, measure the unbalanced vibration with the machine in operation and determine a profile of a critical speed. For example, in order to measure the vibration at an N-th order critical speed in a rotary machine, it is necessary first to dampen the first to (N−1)th order vibrations in order to exceed the N-th order critical speed. According to the balancing techniques, the vibration is suppressed by adding a balance weight to a rotary body or, conversely, by cutting off a part of the rotary body on the basis of the measured unbalanced vibration. Utilizing the data for designing a rotary body, which is obtained by thus balancing a plurality of critical speeds, requires many process steps and requires extensive time and labor.

If a profile (the characteristics of vibrational amplitude with respect to rotational frequency) of a critical speed can be obtained accurately by conducting a test without rotating a rotary body during the designing of a rotary body, it becomes possible to set frequencies at critical speeds suitably and attain a rated revolution velocity while maintaining stable operation of the rotary machine. The operational efficiency of the rotary machine therefore would be improved greatly. The development of such a novel method and apparatus for performing the method has strongly been demanded.

In a rotary machine, a critical speed also exists in a region which exceeds a rated revolution velocity. For example, when a critical speed exists in a rotational frequency region that is somewhat higher than a rated revolution velocity, the rated rotational vibration becomes unstable. However, a profile of a critical speed greater than a rated revolution velocity cannot be obtained accurately since a rotary body cannot be rotated practically at such a critical speed. According to the conventional techniques, a profile of a critical speed greater than a rated revolution velocity is determined simply be estimation in view of the influence upon an analysis value and a rated rotational vibration.

SUMMARY OF THE INVENTION

An object of the present invention is to provide a vibration evaluation method and apparatus which is capable of determining a profile of a critical speed of a rotary body in a static or non-rotating condition within a short period of time under safe conditions and with high accuracy, thereby improving the work efficiency in the designing and manufacturing of a rotary machine.

Another object of the present invention is to provide a method and apparatus capable of accurately determining a profile of a critical speed of a rotary body and that of a critical speed of a rotary body in a region which exceeds a rated revolution velocity.

According to the present invention, there is provided a vibration evaluation method and apparatus for a rotary body in a static or non-rotational state comprising a plurality of bearings for maintaining a rotary body in a non-rotating condition; a rotary vibrator for applying an exciting force to the rotary body which is rotated about a shaft; a vibration sensor for detecting the vibration of the rotary body; a vibration meter for measuring an output from the vibration sensor; and a vibration power source for supplying AC power to the rotary vibrator and for sweeping a frequency of current supplied to the rotary body from a low-frequency region to a high-frequency region, whereby the vibrational characteristics of the rotary body in a simulated rotational or dynamic state are obtained.

The rotary vibrator used in the method of the present invention is preferably provided with a structure comprising a ring-shaped magnet bipolarly magnetized and mounted coaxially on a shaft of the rotary body, a ring-shaped stator, mounted adjacent to the magnet in an axial direction of the shaft, which has the same construction as a regular induction motor, having coils and adapted to generate a rotating magnetic field by controlling an electric current supplied to the coil, and a frequency-variable vibration power source adapted to supply an AC power to the coils of the stator. The magnet and the stator have different magnetic radii and are disposed so as to be opposed to each other in a direction identical with the magnetization direction of the magnet to thereby apply the exciting force which is rotated about the shaft to the rotary body by an interaction of the rotating magnetic field generated by the stator with the magnet. The vibration evaluation is carried out by sweeping a frequency of the rotating magnetic field generated by the stator with the rotary body maintained in a static or non-rotating state by bearings. The magnet my be a permanent magnet or an electromagnet.

When AC power of a predetermined frequency is supplied to the coils on the stator, the rotating magnetic field corresponding thereto is generated. Due to an interaction of the magnetic field generated by the stator with the magnet, a lateral or transverse force is exerted on the rotary body, and the application of this lateral or transverse exciting force is rotated in response to the rotating magnetic field of the stator. This results in rotational vibration of the rotary body, which then shows a vibrational response very similar to the critical speed vibration of a rotating or dynamic state. This enables the determination of a critical speed which is difficult to ascertain by using the previously described conventional one-dimensional vibrating methods. The presence of a critical speed in a region which exceeds a rated revolution velocity can also be determined accurately by merely increasing the frequency of the AC power supplied to the stator.

PREFERRED EMBODIMENTS OF THE INVENTION

Figure 1:
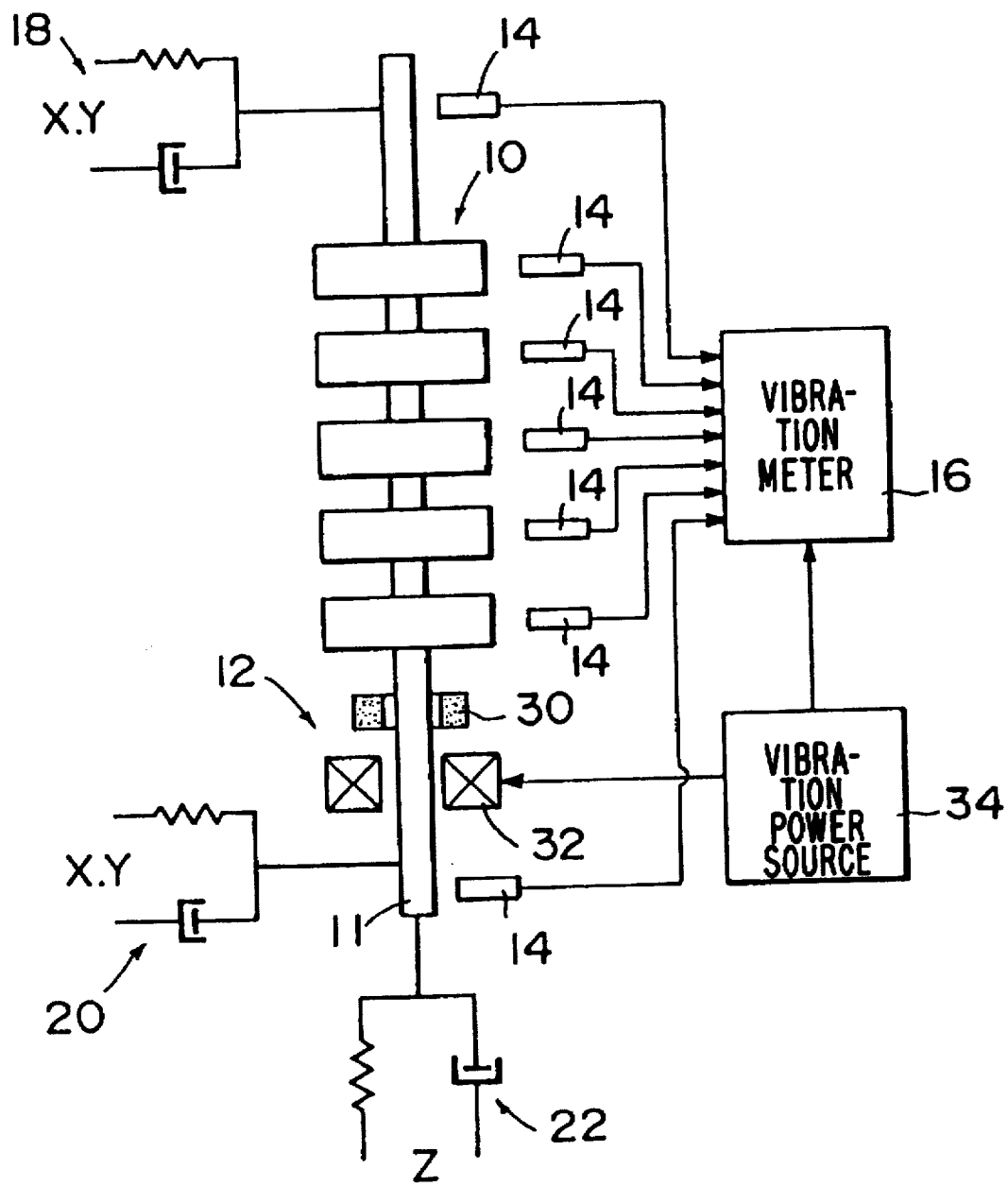
FIG. 1 is a drawing showing an embodiment of the vibration evaluation method and apparatus for a rotary body in a static or non-rotational state according to the present invention.
Figure 2:
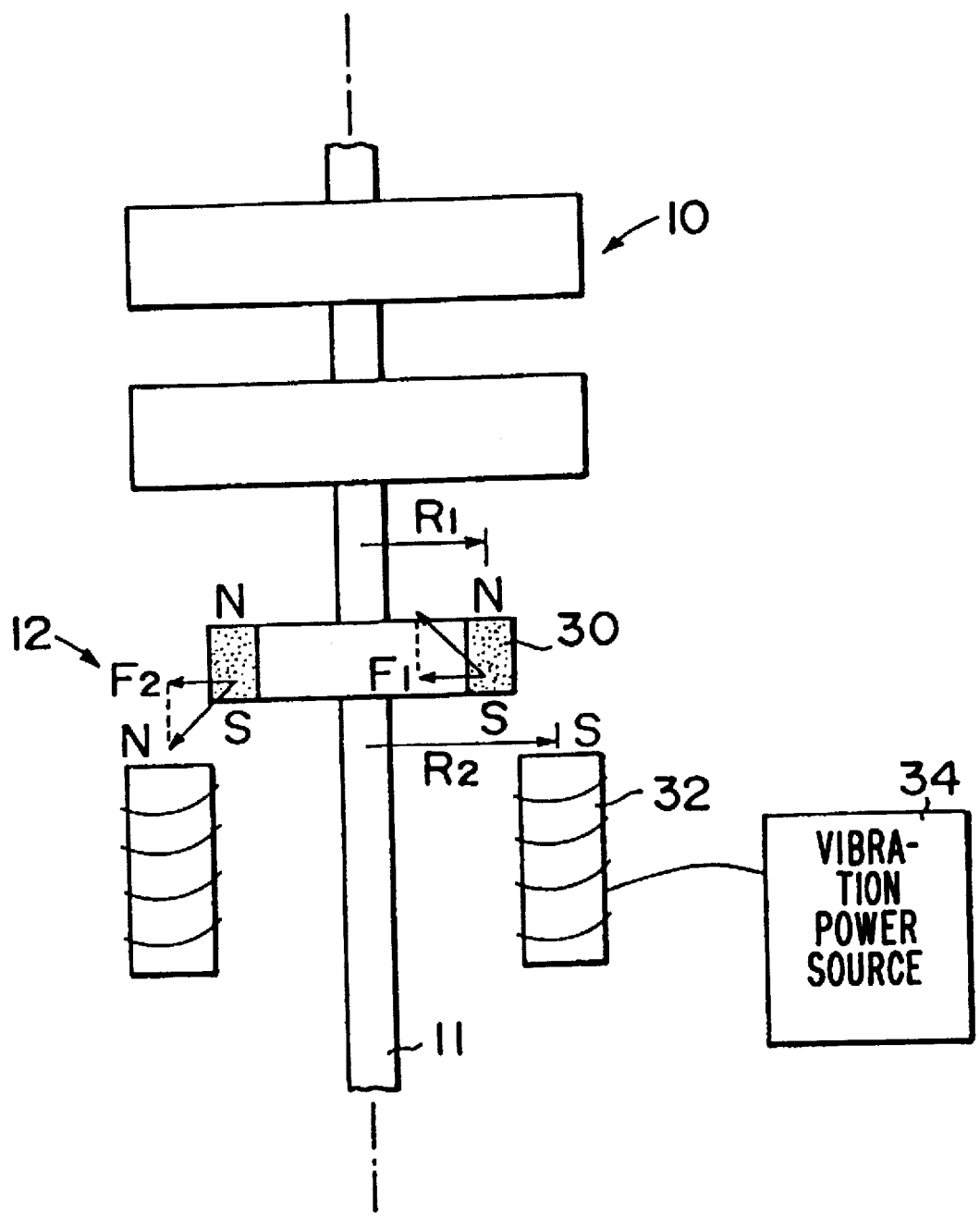
FIG. 2 is a detailed drawing showing an example of a rotary vibrator used in the present invention.

FIG. 1 is a schematic diagram showing an embodiment of the vibration evaluation method and apparatus for a rotary body in a static or non-rotational state according to the present invention, and FIG. 2 a detailed view of a rotary vibrator which is a principal part of the present invention. The vibration evaluation method for a rotary body in a static or non-rotational state shown in FIG. 1 comprises the steps of maintaining a rotary body 10 in a static or non-rotating state; providing a rotary vibrator 12 for applying an exciting force which is rotated about a shaft 11 to the rotary body 10, providing vibration sensors 14 for detecting the vibration of the rotary body 10, and providing a vibration meter 16 for measuring outputs from the vibration sensors 14. A vibrational response is measured by sweeping a rotational frequency of the exciting force which is rotated about the shaft (11). Thus the vibrational characteristics of the rotary body 10 in a simulated rotational or dynamic state are obtained.

The rotary body 10 is supported in the same manner as it is supported while in a rotating or dynamic state of a rotary machine in which the rotary body 10 is to be installed so as to allow operability of the rotating machine. In this embodiment, the rotary body 10 is supported in a horizontal plane (XY direction) by upper and lower radial bearings 18, 20, respectively, each having a spring and a damper, and the rotary body 10 is supported in a vertical direction (Z direction) by a thrust bearing 22 also having a spring and a damper.

As shown in detail in FIG. 2, the rotary vibrator 12 is adapted to apply an exciting force which is rotated about the shaft 11 to the rotary body 10, and comprises a ring shaped permanent magnet 30, a ring-shaped stator 32 having coils and a vibration power source 34. The permanent magnet 30 is bipolarly magnetized in the axial direction, and mounted on the rotary body 10 (shaft 11 of the rotary body in this embodiment) coaxially. The stator 32 may have the same construction as a regular induction motor, and is adapted to generate a substantially bipolar rotating magnetic field with an electric current which is controllably supplied to the coil.

The stator 32 is mounted adjacent to the magnet 30 in an axial direction of the shaft. The permanent magnet 30 and the stator 32 have different magnetic radii (distance between a position in which a magnetic pole is formed and the axis of the rotary body shaft 11, the magnetic radii of the permanent magnet and the stator being represented by symbols R1 and R2 respectively), and are disposed so as to be opposed to each other in the axial direction. The vibration power source 34 is an inverter for supplying alternating current to coils of the stator 32. Furthermore, an inverter in which the frequency of the alternating current can be varied is preferably used.

In the rotary vibrator 12 structure of FIG. 2, the ring-shaped permanent magnet 30 is magnetized such that, for example, the upper and lower surfaces have an N-pole and an S-pole respectively. Assume that an S-pole and an N-pole occur at a certain instant in the right and left side portions respectively in the drawing of the stator 32 due to a current supplied to the coils. Consequently, a left-upward electromagnetic force due to the repulsive force of the S-poles occurs in the right side portion in the drawing, while a left-downward electromagnetic force due to an attractive force between the N-pole and S-pole occurs in the left side portion in the drawing. If they are synthesized, the components in the axial direction of the permanent magnet 10 are in opposite directions and therefore these components offset each other but the components F1 and F2 in the direction (in a horizontal plane in the drawing) perpendicular to the axial direction are in the same direction and are therefore summed up to provide a lateral or transverse force against the shaft 11. The direction of a magnetic field occurring in the stator 32 changes circularly in accordance with the frequency of the alternating current supplied from the vibration power source 34, such that the direction of a lateral or transverse electromagnetic force supplied to the permanent magnet 30 also changes circularly. This lateral or transverse force can be controlled on the basis of a value of the alternating current supplied to the stator 32. Namely, due to the interaction of the rotating magnetic field generated in the stator 32 with the permanent magnet 30, a desired level of an exciting force which is rotated about the shaft 11 can be applied to the rotary body 36, and an electric input generates, according to a desired level, an appropriate exciting force of a rotational vibration vector.

The inverter used as the vibration power source 34 is generally set to produce a rectangular waveform having a variable voltage and frequency by temporarily turning commercial electric current into a direct current, and carrying out positive-negative voltage switching in accordance with the frequency. Such a rectangular wave inverter is commercially available and is very economical. The waveform of the vibrating AC power may alternatively be a sine waveform. However, a sine wave inverter is expensive and is not as commercially available as a rectangular wave inverter.

Returning to FIG. 1, either a single or a plurality of vibration sensors 14 are provided for detecting the vibration of the rotary body 10 in the vicinity of the rotary body 10. A vibration meter 16, such as an oscilloscope or a FFT (high-speed Fourier transformer) for determining a vibrational amplitude is connected to the vibration sensors 14.

The vibration power source 34 is adapted to gradually sweep the frequency of the current supplied to the stator 32 from a low frequency region to a high-frequency region thereby exceeding a critical speed. In accordance with this sweeping operation, the frequency of the rotating magnetic field generated from the stator 32 is also swept, and a vibrational response produced during this operation is measured with the vibration sensors 14 and the vibration meter 16. As a result, the vibration characteristics in a simulated rotational or dynamic state are obtained. Since the vibrational response of the rotary body includes the influence of the ring-shaped permanent magnet 30 mounted on the rotary body, the ring-shaped permanent magnet preferably has the same shape and mass as the rotor of a motor which operates to rotate the rotary body. When the ring-shaped permanent magnet 30 used for rotationally vibrating the rotary body is removed from a rotary machine, it is replaced by the rotor of the driving motor. When the mass of the ring-shaped permanent magnet 30 is different from that of the rotor of the driving motor, the obtained vibration characteristics are subjected to an appropriate correction. In the structure of FIG. 1, the stator of the driving motor can be utilized similarly for the stator 32 for rotationally vibrating the rotary body.

Figure 3:
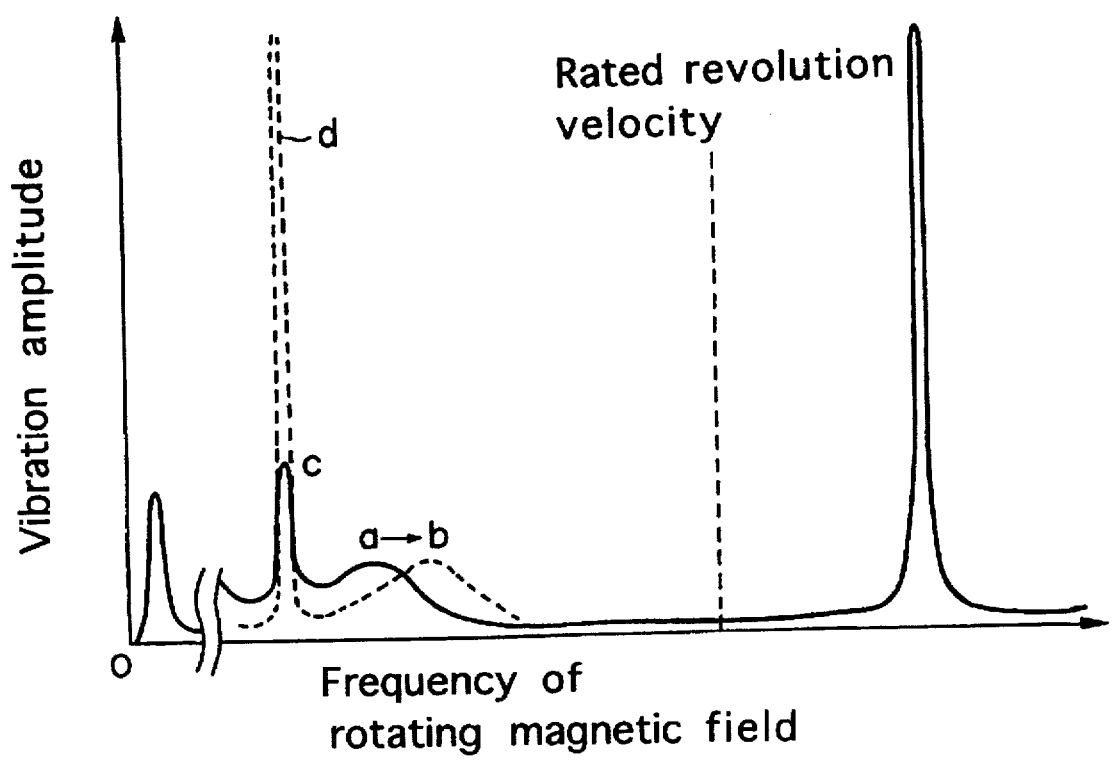
FIG. 3 is a graph showing characteristics of the relation between the rotational frequency and the vibrational amplitude of the present invention.

FIG. 3 is a graph showing an example of the relation between the rotational frequency and the vibrational amplitude of a test rotary body (in order to simplify a description, a part of a vibrational response is omitted). This graph enables the profiles (vibration damping characteristics and arrangement) of critical speeds to be read clearly. As shown in the drawing, even the critical speeds at rotational frequencies higher than the rated revolution velocity can be measured according to the present invention. If a critical speed shown by the letter "a" shifts to a position "b" shown by a broken line, it can be realized that a critical speed shown by the letter "c" in turn violently vibrates in response as shown by the letter "d" (broken line) and diverges (breakage occurs in an actual rotating or dynamic state). Since such profiles of critical speeds can be determined simply in a static or non-rotational state, the designing and manufacturing of the rotary body can be done safely and easily. When a gyromagnetic effect is large, correction is require.

The waveform of the AC power supplied from the vibration power source 34 may be a rectangular waveform as mentioned earlier but, in order to obtain data having a high-degree of accuracy, a sine waveform of a single frequency is preferable. Vibrating a rotary body with AC power using a rectangular waveform, or any other waveform other than a sine waveform, yields a basic frequency and additional frequencies which are obtained by multiplying the basic frequency by odd numbers (odd number-multiplied frequencies). Thus, when the rotary body is vibrated using AC power having such a rectangular waveform, or any other waveform other than a sine waveform, vibrations due to the basic frequency and the odd number-multiplied frequencies are compounded. As a result, a vibrational response occurring when a critical speed exists in a basic frequency may be compounded if an additional critical speed exists in an odd number-multiplied frequency. This produces data having a lower degree of accuracy than data generated when using a sine waveform. Furthermore, the levels of exciting forces which are rotated about the shaft are inversely proportional to the frequency, thus the vibrational response of the rotary body decreases as the odd number-multiplied frequencies increase. Nonetheless, vibration evaluation can be performed for a greater frequency range when a waveform other than a sine wave is used since the frequency range which is swept from a low level to a high level is enlarged as a result of odd number-multiplied frequencies.

The above-described example of the rotary vibrator for a rotary body used in the present invention is preferred, however, a structure for applying a rotational exciting force to a rotary body is not limited to this example. Although a permanent magnet is used as the ring-shaped magnet, it may be replaced by an electromagnet. Since the rotary body is placed in a static or non-rotational state, the supply of an electric current to an electromagnet can be performed easily.

Figure 4:
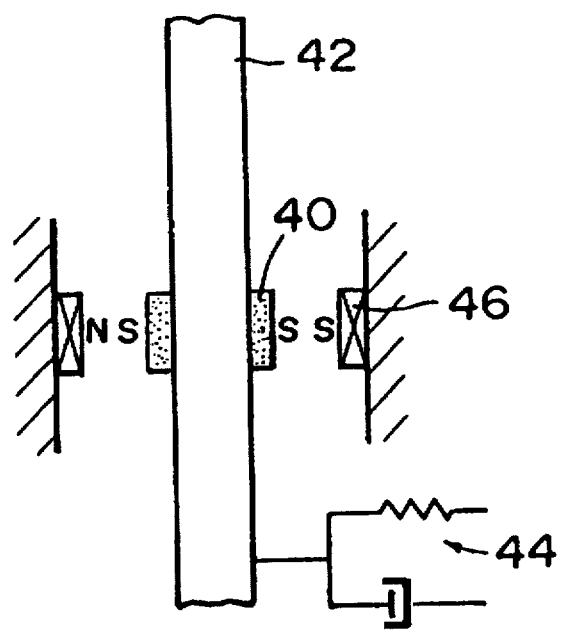
FIG. 4 is a drawing showing another embodiment of the rotary vibrator used in the present invention.

It is also possible that a magnet and a stator can be disposed in the same plane. An example of such an arrangement is shown in FIG. 4. A ring-shaped permanent magnet 40 is radially bipolarly magnetized (the outer circumferential surface has an S-pole, and the inner circumferential surface has an N-pole) and mounted on a rotary body 42. The rotary body 42 is supported by a bearing 44. A stator 46 is ring-shaped, and adapted to generate a rotating magnetic field with an electric current which is controllably supplied to a coil. The permanent magnet 40 and stator 46 are disposed in the same plane so as to be opposite to each other in the radial direction (i.e., the permanent magnet 40 is positioned on the inner side of the stator 46). If a magnetic field generated by the stator 46 in this structure is directed, for example, as shown in FIG. 4, an attractive force of different poles occurs in a left portion of the rotary body 42, while a repulsive force of the same poles occurs in a right portion of the rotary body. Consequently, a leftward force is exerted on the rotary body 42. Since this force rotates with the rotating magnetic field generated by the stator 46, the rotary body 42 receives an exciting force which is rotated about the rotary body 42.

Figure 5:
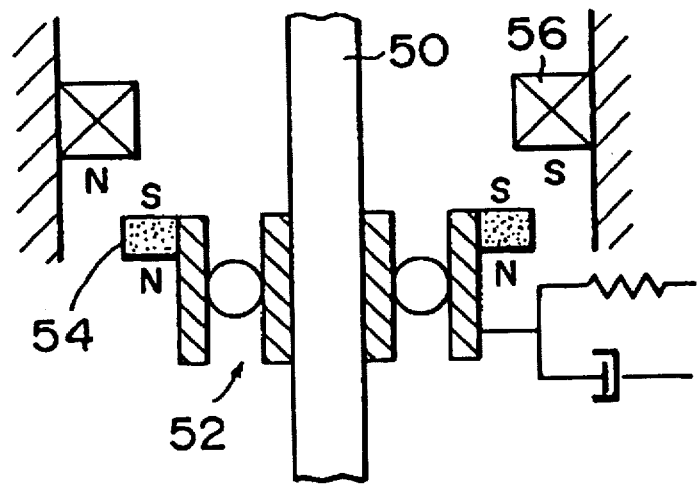
FIG. 5 is a drawing showing still another embodiment of the rotary vibrator used in the present invention.

Although the magnet is mounted directly on the rotary body in both of the above-described examples as shown in FIGS. 2 and 4, it may be mounted via a bearing. Such an example is shown in FIG. 5. The inner surfaces of ball bearings 52 are fixed to a rotary body 50, and a ring-shaped permanent magnet 54 is mounted on the outer circumferential surfaces of the ball bearings 52. In this example, the permanent magnet 54 is axially bipolarly magnetized similar to the permanent magnet 30 as shown in FIG. 2. A ring-shaped stator 56 is disposed so as to be opposed axially to the permanent magnet 54. Such an arrangement of the magnet mounted via the bearings has the advantage in that a rotary body need not be provided with any additional parts. Namely, the rotary body is left mounted with a rotor of a motor which operates to rotate the rotary body 50. The ball bearings 52 may be considered as parts corresponding to the bearing 20 as shown in FIG. 1, to which an exciting force which is rotated about the rotary body 50 is applied to measure a vibrational response.

According to the present invention, a high-quality exciting force which is rotated about a shaft can be applied to a rotary body with high efficiency by exposing a rotating magnetic field onto the rotary body in the same condition in which the rotary body is disposed as if it were rotating. Therefore, the rotary body produces a vibrational response, though the rotary body is in a static or non-rotational state, which is very similar to the response obtained when the rotary body is in a rotating or dynamic state in which the gyroscopic effect due to the rotation of the rotary body is eliminated at a critical speed. Accordingly, a profile of a critical speed can be obtained simply and with a high degree of accuracy, and the evaluation of vibration can be carried out easily, by merely sweeping the frequency of a rotating magnetic field.

When anisotropy exists in a rotary body, the charged position of the rotary body appears as a vibration according to the method of the present invention, such that the symmetry of the rotary body can be obtained. Since the rotary body is not actually rotated, the arrangement of critical speeds and the vibrational amplitude of the rotary body, even for a velocity exceeding a rated revolution velocity, can be determined reliably.

The present invention enables greater efficiency in the designing and manufacturing of a rotary machine and allows for an easier and accurate determination of critical speeds. Since a critical speed and a vibration response can be obtained before an actual rotation test is conducted, the accuracy and efficiency of a vibration balancing operation can be improved. Moreover, the present invention can be applied to a performance evaluation test for vibration elements such as bearings.

What is claimed is:

1. A method for evaluating vibrations of a rotary body, comprising the steps of:

maintaining the rotary body in a static or non-rotational state;

applying an exciting force to the rotary body by using a rotary vibrator, said exciting force being rotated about a shaft of the rotary body thereby causing a vibrational response from the rotary body;

sweeping a frequency of current supplied to said rotary vibrator from a low-frequency region to a high-frequency region so as to vary said vibrational response from the rotary body;

detecting said vibrational response from the rotary body by using at least one vibration sensor; and measuring an output of said at least one vibration sensor.

2. A method according to claim 1, wherein said rotary vibrator comprises a ring-shaped magnet which is bipolarly magnetized and a ring-shaped stator having coils, wherein a creation of said exciting force comprises the steps of:

supplying AC power to said coils of said stator to generate a rotating magnetic field in said stator; and interacting said rotating magnetic field with a magnetic field of said magnet, thereby creating said exciting force.

3. An apparatus for evaluating vibrations of a rotary body comprising:

a plurality of bearings for maintaining the rotary body in a static or non-rotational state;

a rotary vibrator for applying an exciting force to the rotary body by rotating said exciting force about a shaft of the rotary body to produce a vibrational response from the rotary body;

at least one vibration sensor for detecting said vibrational response from the rotary body;

a vibration meter for measuring an output from said at least one vibration sensor; and a vibration power source for supplying AC power to said rotary vibrator and for sweeping a frequency of current supplied to the rotary vibrator from a low-frequency region to a high-frequency region.

4. An apparatus according to claim 3, wherein said rotary vibrator comprises:

a ring-shaped magnet which is axially bipolarly magnetized and which is to be mounted coaxially on the shaft of the rotary body; and a ring-shaped stator having coils, wherein said stator is mounted adjacent to said magnet in a direction to be axial of the shaft, and wherein said coils are supplied with the AC power from said vibration power source to generate a rotating magnetic field which interacts with a magnetic field produced by said magnet to thereby produce said exciting force.

5. An apparatus according to claim 3, wherein said rotary vibrator comprises:

a ring-shaped magnet which is radially bipolarly magnetized and which is to be mounted coaxially on the shaft of the rotary body; and a ring-shaped stator having coils, wherein said stator and said magnet are mounted in a same plane so as to be opposite to each other in a radial direction, and wherein said coils are supplied with the AC power from said vibration power source to generate a rotating magnetic field which interacts with a magnetic field produced by said magnet to thereby produce said exciting force.

6. An apparatus according to claim 3, wherein said rotary vibrator comprises:

a ring-shaped magnet which is axially bipolarly magnetized and is mounted on an outer circumferential surface of at least one of said plurality of bearings, wherein an inner surface of said at least one of said plurality of bearings is mounted to the rotary body; and a ring-shaped stator having coils, wherein said stator is mounted adjacent to said magnet in a direction to be axial of the shaft, and wherein said coils are supplied with the AC power from said vibration power source to generate a rotating magnetic field which interacts with a magnetic field produced by said magnet to thereby produce said exciting force.

* * * * *